(12) United States Patent
Kwon et al.

(10) Patent No.: US 9,425,440 B2
(45) Date of Patent: Aug. 23, 2016

(54) COMPACT BATTERY CELL HAVING IMPROVED DURABILITY AND BATTERY PACK COMPRISING THE SAME

(71) Applicant: LG Chem, Ltd., Seoul (KR)

(72) Inventors: Sungjin Kwon, Daejeon (KR); Soonho Ahn, Seoul (KR); Ki Woong Kim, Daejeon (KR); Pillgyu Jang, Daejeon (KR); Young Hun Kim, Daejeon (KR); Sunghan Yoon, Daejeon (KR)

(73) Assignee: LG Chem, Ltd. (KR)

( * ) Notice: Subject to any disclaimer, the term of this patent is extended or adjusted under 35 U.S.C. 154(b) by 38 days.

(21) Appl. No.: 14/450,352

(22) PCT Filed: Mar. 12, 2013

(86) PCT No.: PCT/KR2013/001959
§ 371 (c)(1),
(2) Date: Aug. 4, 2014

(87) PCT Pub. No.: WO2013/137611
PCT Pub. Date: Sep. 19, 2013

(65) Prior Publication Data
US 2015/0044536 A1    Feb. 12, 2015

(30) Foreign Application Priority Data
Mar. 14, 2012 (KR) .................. 10-2012-0025868

(51) Int. Cl.
*H01M 6/12* (2006.01)
*H01M 6/46* (2006.01)
(Continued)

(52) U.S. Cl.
CPC ............ *H01M 2/0207* (2013.01); *H01M 2/024* (2013.01); *H01M 10/04* (2013.01);
(Continued)

(58) Field of Classification Search
CPC ............ H01M 2/0207; H01M 2/0426; H01M 2/0456; H01M 2/0469; H01M 2/06
USPC .................. 429/157, 149, 158, 159, 163
See application file for complete search history.

(56) References Cited

U.S. PATENT DOCUMENTS

| | | | | |
|---|---|---|---|---|
| 940,288 | A | * | 11/1909 | Tate .......... H01M 10/0413 429/131 |
| 4,477,546 | A | * | 10/1984 | Wheeler .......... H01M 4/70 429/211 |
| 8,771,864 | B2 | * | 7/2014 | Lim .......... H01M 2/1077 429/159 |

FOREIGN PATENT DOCUMENTS

| JP | 06150893 | 5/1994 |
|---|---|---|
| JP | 2000-030670 A | 1/2000 |

(Continued)

OTHER PUBLICATIONS

International Search Report for Application No. PCT/KR2013/001959 dated Jun. 7, 2013.

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

Disclosed herein are a battery cell including an electrode assembly configured to have a structure including cathodes, anodes, and separators respectively disposed between the cathodes and the anodes, the electrode assembly being provided with a through hole in a direction in which the electrodes are stacked, and a battery case provided at each side thereof with an opening communicating with the through hole and a battery pack including the same.

23 Claims, 8 Drawing Sheets

(51) Int. Cl.
  *H01M 6/42*   (2006.01)
  *H01M 2/24*   (2006.01)
  *H01M 2/00*   (2006.01)
  *H01M 2/02*   (2006.01)
  *H01M 10/04*  (2006.01)
  *H01M 4/02*   (2006.01)

(52) U.S. Cl.
  CPC ............... *H01M2/0287* (2013.01); *H01M 4/02* (2013.01); *H01M 2004/021* (2013.01); *H01M 2220/10* (2013.01); *H01M 2220/20* (2013.01); *H01M 2220/30* (2013.01)

(56) References Cited

FOREIGN PATENT DOCUMENTS

| | | |
|---|---|---|
| JP | 2000285881 A | 10/2000 |
| JP | 2000-340265 A | 12/2000 |
| KR | 20030059930 A | 7/2003 |

\* cited by examiner

COMPACT BATTERY CELL HAVING IMPROVED DURABILITY AND BATTERY PACK COMPRISING THE SAME

CROSS-REFERENCE TO RELATED APPLICATIONS

The present application is a continuation of International Patent Application No. PCT/KR2013/001959, filed Mar. 12, 2013, which claims the priority from Korean Application No. 10-2012-0025868, filed Mar. 14, 2012, in the Korean Intellectual Property Office, the disclosures of which are incorporated herein by reference.

TECHNICAL FIELD

The present invention relates to a compact battery cell having improved durability and a battery pack including the same and, more particularly, to a battery cell including an electrode assembly configured to have a structure including cathodes, anodes, and separators respectively disposed between the cathodes and the anodes, the electrode assembly being provided with a through hole in a direction in which the electrodes are stacked, and a battery case provided at each side thereof with an opening communicating with the through hole and a battery pack including the same.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high power and large capacity are necessary for the middle or large-sized devices. Size and weight of a battery module are directly related to a receiving space and power of a corresponding middle or large-sized device. For this reason, manufacturers are trying to manufacture small and lightweight battery modules.

A cylindrical battery cell, a prismatic battery cell, and a pouch-shaped battery cell, which are classified based on their shapes, are used as a unit cell of a battery module or a battery pack. Among these batteries, the pouch-shaped battery cell, which can be stacked with high integration, has high energy density per weight, and is inexpensive, has attracted considerable attention.

A concrete example of the unit cell is shown in FIGS. 1A and 1B, which are exploded perspective views typically showing the general structure of a conventional representative pouch-shaped secondary battery.

Referring to FIG. 1A, a pouch-shaped secondary battery 10 includes an electrode assembly 20 having pluralities of electrode tabs 21 and 22 protruding therefrom, two electrode leads 30 and 31 respectively connected to the electrode tabs 21 and 22, and a battery case 40 to receive the electrode assembly 20 in a sealed state such that portions of the electrode leads 30 and 31 are exposed outward from the battery case 40.

The battery case 40 includes a lower case 42 having a depressed receiving part 41, in which the electrode assembly 20 is located, and an upper case 43 to cover the lower case 42 such that the electrode assembly 20 is sealed in the battery case 40. The upper case 43 and the lower case 42 are connected to each other by thermal bonding in a state in which the electrode assembly 20 is mounted therebetween to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed with a corresponding end of the lower case 42 such that the upper case 43 and the lower case 42 may be hingedly connected to each other.

In addition, as shown in FIGS. 1A and 1B, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above method.

DISCLOSURE

Technical Problem

According to a trend of miniaturizing and thinning a device using a secondary battery as an electric source or a power source, there is a high necessity for provision of a space to receive electronic parts mounted in the device. Conventionally, the electronic parts mounted in the device were miniaturized and thinned.

In order to put the miniaturized or thinned electronic parts in the device, however, it is still necessary to provide an additional space other than a space in which a battery cell is mounted. In addition, the device may have a dead space depending on the shape of the electronic parts, which may cause reduction of energy density per volume of the device.

In addition, an electrode assembly may move in an inner space of a battery case due to external impact, which may cause an internal short circuit of the battery cell.

Therefore, the present invention has been made to solve the above problems, and it is an object of the present invention to provide a battery cell configured to have a structure as described below and a battery pack including the same.

Technical Solution

In accordance with one aspect of the present invention, the above and other objects can be accomplished by the provision of a battery cell having holes formed through an electrode assembly and a battery case and a battery pack including the same.

Consequently, the battery cell according to the present invention includes an electrode assembly configured to have a structure including cathodes, anodes, and separators respectively disposed between the cathodes and the anodes, the electrode assembly being provided with a through hole in a direction in which the electrodes are stacked, and a battery case provided at each side thereof with an opening communicating with the through hole.

The electrode assembly is configured to have a structure including cathodes, anodes, and separators respectively disposed between the cathodes and the anodes. The electrode assembly may be a stacked type electrode assembly, which is manufactured by sequentially stacking cathode plates, separator plates, and anode plates such that the separator plates are respectively disposed between the cathode plates and the anode plates, a wound type electrode assembly, which is manufactured by sequentially stacking a sheet type cathode, a sheet type separator, and a sheet type anode such that the sheet type separator is disposed between the sheet type cathode and the sheet type anode and winding the sheet type cathode, the sheet type separator, and the sheet type anode in a state in which the sheet type cathode, the sheet type separator, and the sheet type anode are stacked, or a combination (stacked/folded) type electrode assembly, which is manufactured by arranging one or more polarized bodies selected from a group consisting of a cathode plate, an anode plate, and a stacked type electrode assembly on a sheet type separator and winding or folding the sheet type separator. The stacked/folded type electrode assembly may be manufactured using two or more sheet type separators In the electrode assembly constituting the battery cell according to the present invention, the through hole is formed through the electrode assembly in the direction in which the electrodes are stacked.

The position of the through hole is not particularly restricted.

For example, the center of the through hole may be aligned with the planar center of the electrode assembly when viewed from above in the direction in which the electrodes are stacked. On the other hand, the center of the through hole may not be aligned with the planar center of the electrode assembly.

In addition, the shape of the through hole is not particularly restricted.

For example, the through hole may be formed in the shape of a circular cylinder, an oval figure, or a polygonal column. That is, the through hole may be formed in the shape of a circle, an oval, or a polygon when viewed from above in the direction in which the electrodes are stacked.

The area of a stack surface of each separator directly contacting a corresponding cathode and a corresponding anode may be equal to or greater than a larger one selected between the area of the stack surface of the cathode and the area of the stack surface of the anode.

In a case in which the area of the stack surface of the separator is greater than a larger one selected between the area of the stack surface of the cathode and the area of the stack surface of the anode, the separator may protrude toward the center of the through hole in a direction perpendicular to the stack surface.

The end of the separator protruding toward the center of the through hole may be bent or thermally bonded in a bent state while wrapping the end of the cathode or the anode. In this case, it is possible to prevent an internal short circuit of the battery cell due to external impact since the separator wraps the edge of the cathode or the anode.

In the above description, the cathode may be a cathode sheet or a sheet type cathode, the anode may be an anode sheet or a sheet type anode, and the separator may be a separator sheet or a sheet type separator.

Meanwhile, a damping member may be further mounted to the inside of the through hole of the electrode assembly. The damping member may be formed in the shape of a hollow circular cylinder or a hollow polygonal column corresponding to the shape of the through hole.

In addition, hollow support plates may be formed at the upper end and the lower end of the hollow circular cylinder.

The support plates may fill a space defined between the electrode assembly and the battery case or may contact opposite major surfaces of the battery case. According to circumstances, the support plates may push the opposite major surfaces of the battery case to restrain a phenomenon in which the electrode assembly moves in the battery case when external impact is applied to the battery cell.

The electrode assembly may be formed in the shape of a circle, an oval, or a polygon when viewed from above in the direction in which the electrodes are stacked.

The battery case is not particularly restricted so long as the battery case has a receiving space to receive the electrode assembly and an open edge of the battery case, through which the electrode assembly is inserted into the receiving space, can be sealed. The open edge of the battery case may be sealed using a well-known method, such as welding or thermal bonding, based on the material of the battery case.

The battery case may be a can-shaped battery case or a pouch-shaped battery case. The can-shaped battery case may be formed of a metal material or a plastic material and the pouch-shaped battery case may be formed of a laminate sheet including a resin layer and a metal layer.

The laminate sheet may be configured to have a structure in which resin layers are applied to opposite major surfaces of a metal blocking layer. For example, the laminate sheet may be configured to have a structure in which an outer resin layer exhibiting high durability is attached to one major surface (outer surface) of a metal blocking layer and a resin sealant layer exhibiting a high thermal bonding property is attached to the other major surface (inner surface) of the metal blocking layer.

In a concrete example, the metal blocking layer may be formed of aluminum exhibiting a gas intercepting property and ductility sufficient to configure in the form of a thin film, or a material containing aluminum.

It is required for the outer resin layer to exhibit high resistance against external environment. For this reason, the outer resin layer may be made of a polymer resin, such as polyethylene terephthalate (PET) or oriented nylon film, exhibiting more than predetermined tensile strength and weather resistance.

In addition, the resin sealant layer is made of a cast polypropylene (CPP) resin which exhibits a high thermal bonding property (thermal adhesive property) and a low hygroscopic property, which is necessary to restrain permeation of an electrolyte, and is not expanded or is not corroded by the electrolyte.

Generally, the open edge of the can-shaped battery case may be sealed by welding in a state in which the open edge of the can-shaped battery case is covered by a cover. In the pouch-shaped battery case, on the other hand, the outer circumference of the receiving unit may be sealed by thermal bonding as shown in FIGS. 1A and 1B.

In the battery case constituting the battery cell according to the present invention, the inside of the opening of the battery case communicating with the through hole of the electrode assembly may be further welded or thermally bonded.

In an unlimited embodiment of the present invention, the battery cell according to the present invention may include an electrode assembly configured to have a structure including cathodes, anodes, and separators respectively disposed between the cathodes and the anodes, the electrode assembly being provided with a through hole in a direction in which the electrodes are stacked, and a battery case provided at each side thereof with an opening communicating with the through hole, thermally bonded sealing portions being formed along the outer circumference of a receiving unit to receive the electrode assembly and the inside of the opening.

Even in the can-shaped battery case, a welded portion may be formed along the inside of the opening of the battery case in the same manner.

In another unlimited embodiment of the present invention, a sealing tape to increase sealing force may be attached to the thermally bonded sealing portion such that the sealing tape wraps the thermally bonded sealing portion.

Even in the can-shaped battery case, a sealing tape may be attached to the welded portion in the same manner.

Meanwhile, an opening support member may be further mounted along the inside of the opening of the battery case. The opening support member may be formed in the shape of a hollow circular cylinder or a hollow polygonal column corresponding to the shape of the opening. In addition, hollow support plates may be formed at the upper end and the lower end of the hollow circular cylinder.

The support plates may contact opposite major surfaces of the battery case. According to circumstances, the support plates may push the opposite major surfaces of the battery cell to restrain a phenomenon in which the electrode assembly moves in the battery case when external impact is applied to the battery cell.

In the battery cell according to the present invention, electrode tabs or electrode leads coupled to the electrode tabs may be formed at one end of the battery cell. Alternatively, the electrode tabs or the electrode leads may be formed at opposite ends of the battery cell or at one end of the battery cell and one side of the battery cell adjacent thereto.

In addition, in the battery cell according to the present invention, electrode tabs protruding from electrode plates constituting the electrode assembly may be exposed in the through hole or the opening. On the other hand, electrode leads coupled to the electrode tabs may be exposed in the through hole or the opening. In this case, the through hole or the opening is utilized and, therefore, it is possible to provide a compact battery cell.

In accordance with another aspect of the present invention, there is provided a battery pack including the battery cell mounted in a pack case.

In a concrete example, the pack case may be provided with a through hole communicating with the through hole of the electrode assembly of the battery cell and the opening of the battery case.

In accordance with a further aspect of the present invention, there is provided a device including the battery pack. For example, the device may be selected from a group consisting of a laptop computer, a mobile phone, a portable display player (PDP), a portable multimedia player (PMP), an MP3 player, a digital still camera (DSC), a digital video recorder (DVR), a smart phone, a global positioning system (GPS), a camcorder, a power tool, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, or a power storage device, to which, however, the present invention is not limited.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 2:
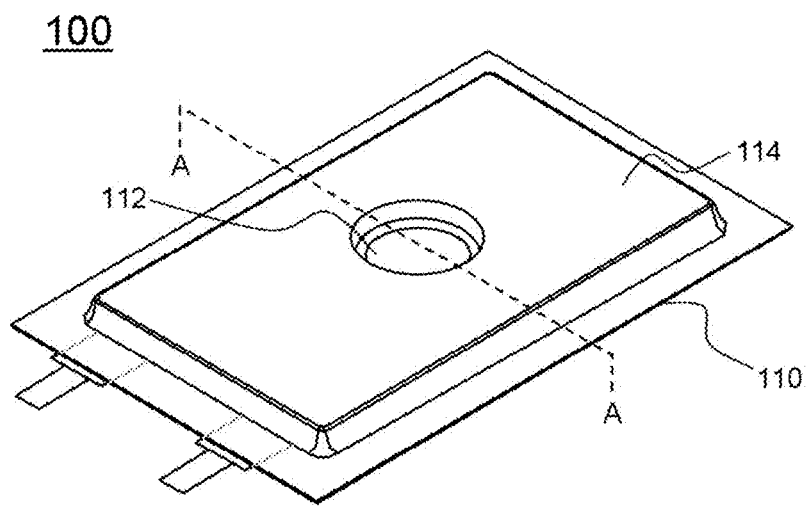
FIG. 2 is a typical view showing a battery cell according to an embodiment of the present invention.
Figure 3:
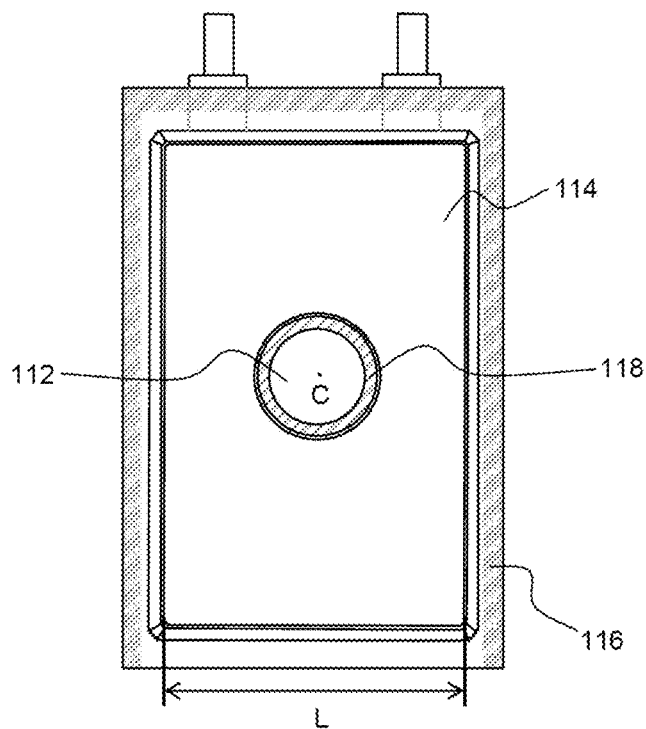
FIGS. 3 and 4 are respectively plan and side typical views of FIG. 2.
Figure 4:
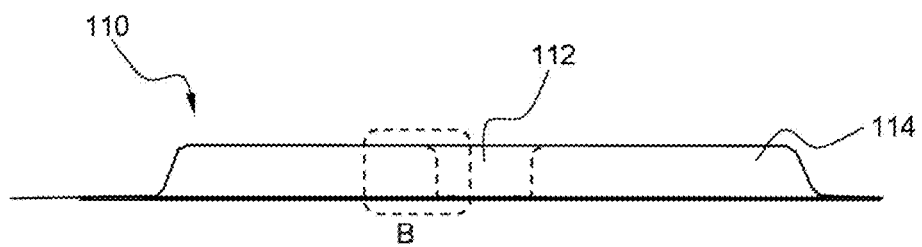

FIG. 2 is a typical view showing a battery cell according to an embodiment of the present invention and FIGS. 3 and 4 are respectively plan and side typical views of FIG. 2.

Referring to these drawings, a battery cell 100 is configured such that a middle opening 112 is formed through a battery case 110 formed of a laminate sheet including a resin layer and a metal layer and an electrode assembly mounted in the battery case 110 is provided at the middle thereof with a through hole so as to correspond to the shape of the battery case 110. The structure of the electrode assembly will be described with reference to FIGS. 6 to 8.

A receiving unit 114 of the battery case 110, in which the electrode assembly is mounted, is provided at the outer circumference thereof with a thermally bonded outer circumferential sealing portion 116. In addition, a thermally bonded inner circumferential sealing portion 118 is formed along the inside of the middle opening 112 of the battery case 110. Consequently, the battery case 119 is sealed so as to be isolated from the outside.

The electrode assembly mounted in the battery case 110, though which the middle opening 112 is formed, is fixed by the middle opening 112 such that the electrode assembly is prevented from being pushed by external impact, whereby an internal short circuit of the battery cell 100 is prevented. In addition, the battery cell is flexible to twist based on the structure in which the through hole and the middle opening 112 are formed at the battery cell 100.

Meanwhile, mobile devices have been miniaturized and thinned with development of technology related to electronic devices and, therefore, continuous research has been conducted into miniaturization of parts and design of an internal structure. In a case in which a device (not shown) has a portion protruding toward a space to receive a battery cell, the portion of the device is located the middle opening 112 and the through hole such that the device is further miniaturized and thinned, thereby efficiently designing the device.

In addition, a rotatable part may be mounted in the middle opening 112 and the through hole. In this case, radii of the middle opening 112 and the through hole may be designed in consideration of a rotational radius of the rotatable part to prevent the increase of volume due to the rotatable part.

In addition, a battery cell fixing member corresponding to the shape of the middle opening 112 and the through hole of the battery cell is located at a region of the device (not shown) at which the battery cell is mounted to easily fix the battery cell without any additional battery cell fixing structure.

The center C of the middle opening 112 is located with respect to a planar center of the electrode assembly in a direction in which electrodes are stacked within an error range equivalent to 30% the length of a short side L of the rectangle. In the drawing, the center C of the middle opening 112 is substantially aligned with the planar center of the electrode assembly.

Figure 1A:
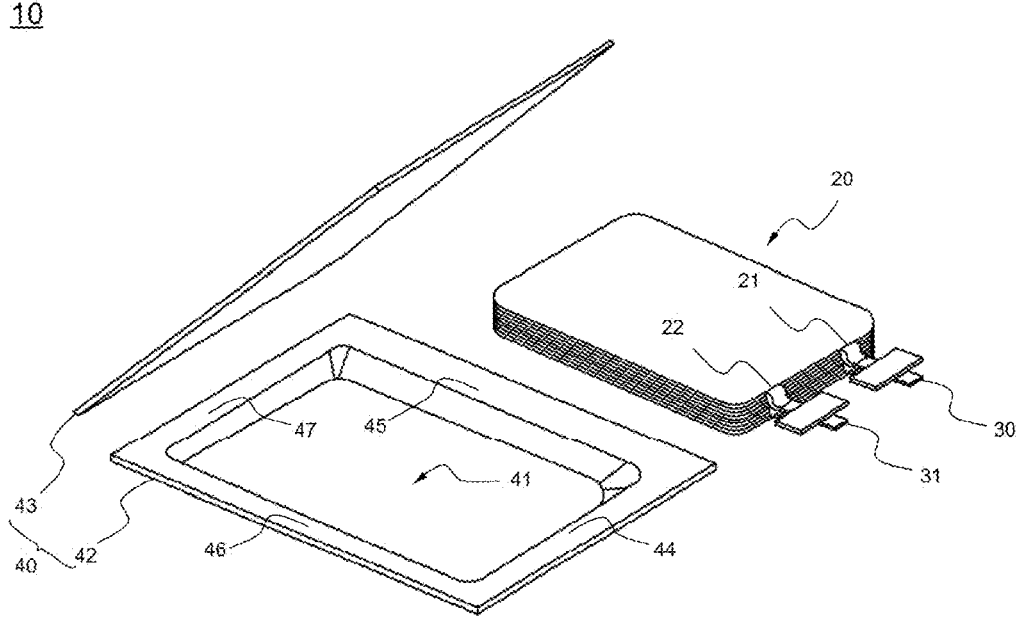
FIGS. 1A and 1B are exploded perspective views showing a conventional representative pouch-shaped secondary battery.
Figure 1B:
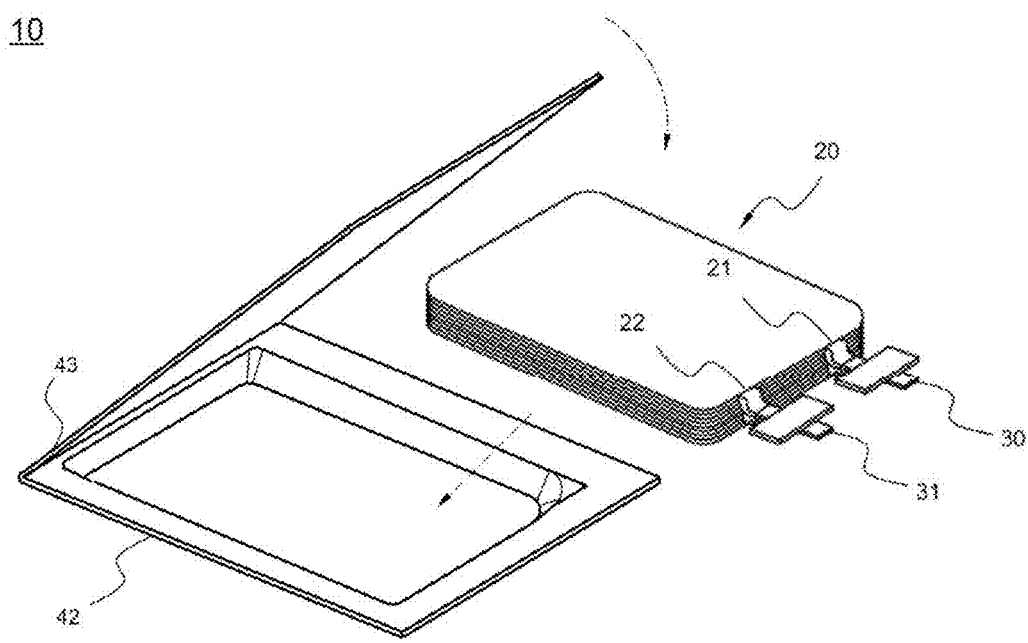
Figure 5:
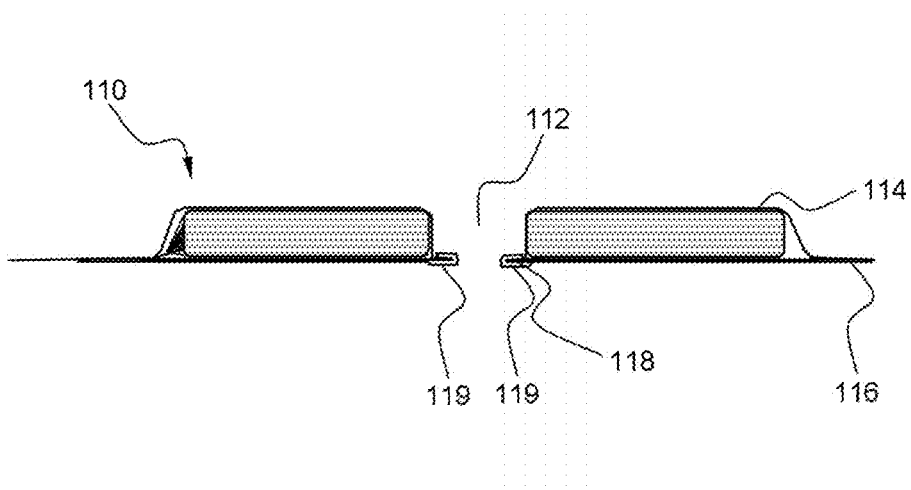
FIG. 5 is a vertical sectional view taken along line A-A of FIG. 1 typically showing a structure in which a sealing tape is attached to a thermally bonded sealing portion.
Figure 6:
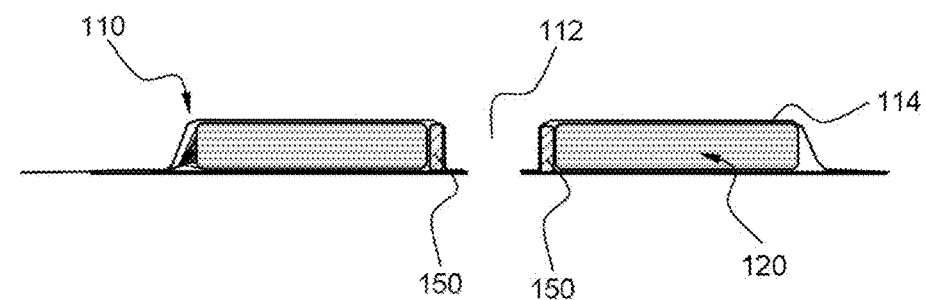
FIG. 6 is a vertical sectional view taken along line A-A of FIG. 1 typically showing a structure including a damping member.
Figure 7:
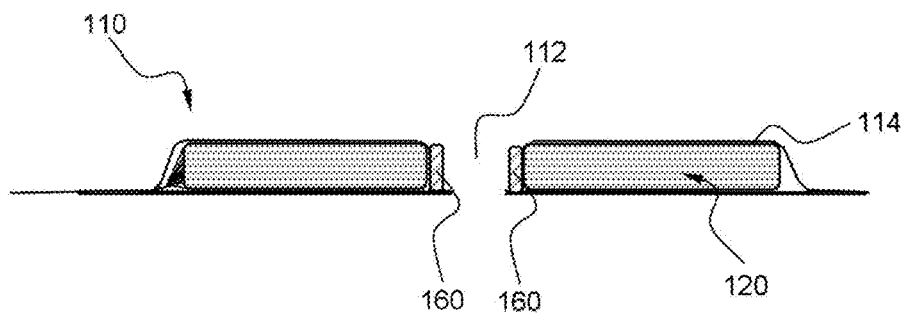
FIG. 7 is a vertical sectional view taken along line A-A of FIG. 1 typically showing a structure including an opening support member.

FIGS. 5 to 7 are vertical sectional views taken along line A-A of FIG. 1 typically showing a structure including a sealing tape, a structure including a damping member, and a structure including an opening support member, respectively.

Referring first to FIG. 5, a sealing tape 129 to increase sealing force of the thermally bonded sealing portion 118 is attached to the thermally bonded sealing portion 118 such that the sealing tape 129 wraps the thermally bonded sealing portion 118. Meanwhile, the sealing width of the thermally bonded sealing portion formed along the inside of the middle opening may be less than that of the outer circumferential sealing portion 116 of the battery case 110 according to the shape or structure of the middle opening 112. As a result, the sealing force of the thermally bonded sealing portion 118 formed along the inside of the middle opening may be lower than that of the outer circumferential sealing portion 116 of the battery case 110. For this reason, the sealing tape 119 is attached to the thermally bonded sealing portion 118 to increase sealing force of the thermally bonded sealing portion 118.

Referring to FIG. 6, a damping member 150 is disposed at the inside of the through hole of the electrode assembly. The damping member 150 serves as a damper to prevent the electrode assembly 120 from being damaged in the battery case 110 when external impact is applied to the battery cell. The damping member 150 is configured to have a structure to fill a space defined between the inside of the through hole of the electrode assembly 120 and the battery case 110. Consequently, the damping member 150 prevents movement of the electrode assembly 120 in the battery case 110.

Referring to FIG. 7, an opening support member 160 is disposed along the inside of the middle opening 112 of the battery case 110. The opening support member 160 is mounted to the inside of the middle opening 112 of the battery case 110 in the form of a ring. The opening support member 160 is configured to have a structure that supports the inside of the middle opening 112 to prevent damage to a sealing region of the thermally bonded sealing portion 118 when the electrode assembly 120 moves in the battery case 110.

Figure 8:
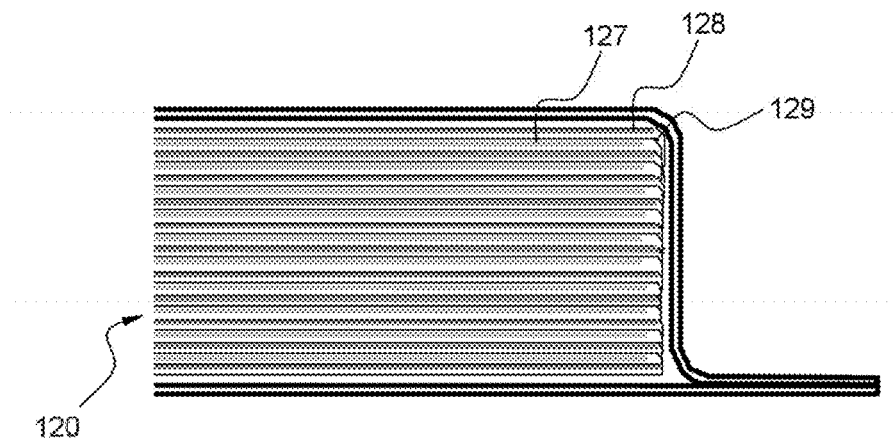
FIG. 8 is a typical view showing the internal structure of a battery case at region B of FIG. 4.

FIG. 8 is a typical view showing the internal structure of the battery case at region B of FIG. 4.

Referring to FIG. 8, the electrode assembly 120 is configured to have a structure in which cathodes 127, anodes 128, and separators 129 respectively disposed between the cathodes 127 and the anodes 128 are stacked and ends of the separators 129 are bent to cover the edges of the cathodes 127 or the anodes 128 at the through hole formed at the middle of the electrode assembly 120. That is, the separators 129 protects the edges of the cathodes 127 or the anodes 128 while covering the edges of the cathodes 127 or the anodes 128 to prevent a short circuit of the battery cell due to external impact.

Figure 9:
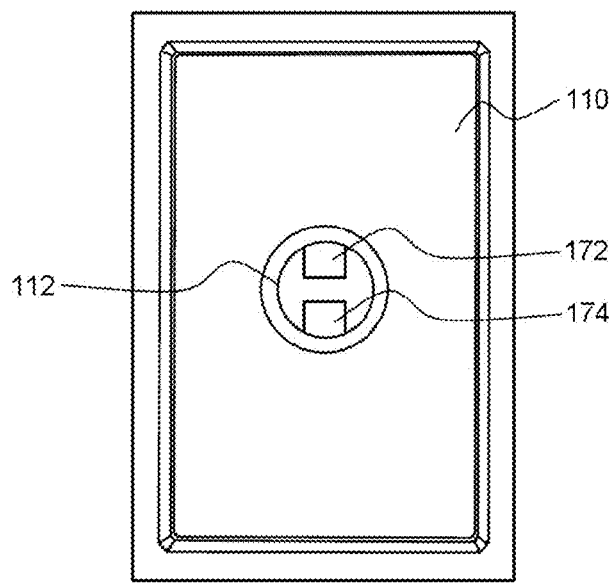
FIG. 9 is a typical view showing a battery cell according to another embodiment of the present invention.

FIG. 9 is a typical view showing a battery cell according to another embodiment of the present invention.

Referring to FIG. 9, a cathode lead 172 and an anode lead 174 connected to an electrode assembly protrude inwardly of a middle opening 112 of a battery case 110. Unlike a conventional battery cell configured to have a structure in which a cathode lead and an anode lead protrude from the outer circumference of a battery case, therefore, it is not necessary to form a space for connection between the cathode lead and the anode lead and an external device. Consequently, a space defined in the through hole of the battery cell is maximally utilized.

Figure 10:
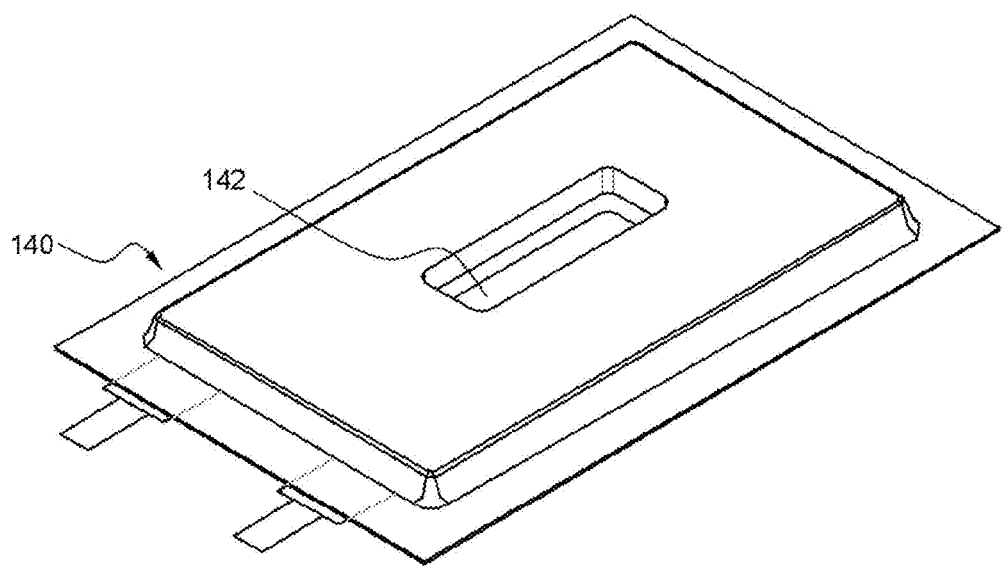
FIG. 10 is a typical view showing a battery cell according to a further embodiment of the present invention.

FIG. 10 is a typical view showing a battery cell according to a further embodiment of the present invention.

The battery cell of FIG. 10 is identical in structure to the battery cell of FIG. 2 except that a middle opening of a battery case and a through hole of an electrode assembly of the battery cell of FIG. 10 are different in structure from the middle opening of the battery case and the through hole of the electrode assembly of the battery cell of FIG. 2 and, therefore, a repeated description will be omitted.

Referring to FIG. 10, a middle opening 142 of a battery case 140 and a through hole of an electrode assembly are formed approximately in the shape of a rectangular having round corners. However, the shape of the middle opening and the through hole is not particularly restricted. For example, the middle opening and the through hole may be formed in various shapes, such as an oval, a polygon, and a circle as shown in FIG. 2 according to the structure of a battery cell receiving space of a device.

Figure 11:
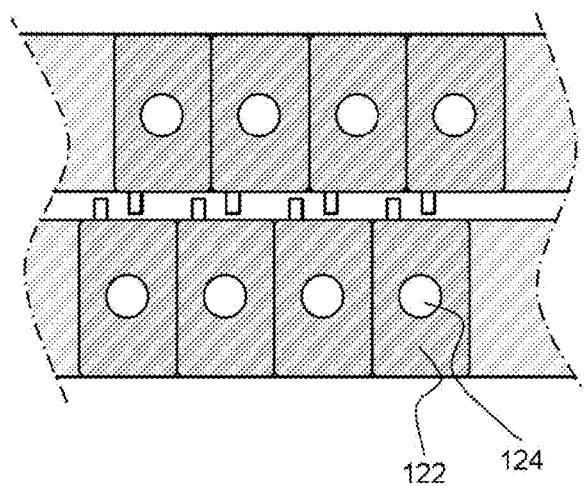
FIGS. 11 to 13 are typical views showing a process of manufacturing the battery cell of FIG. 1.
Figure 12:
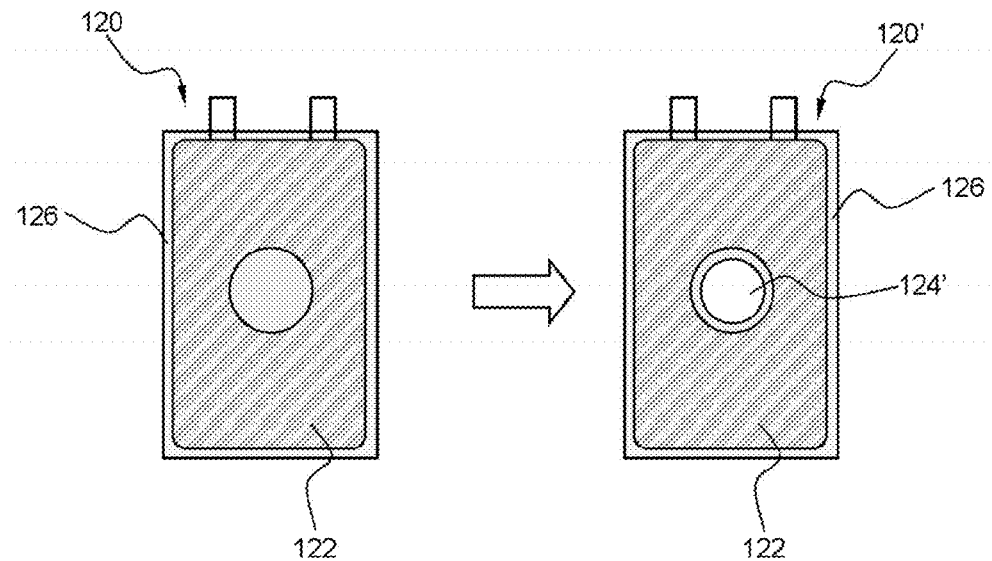
Figure 13:
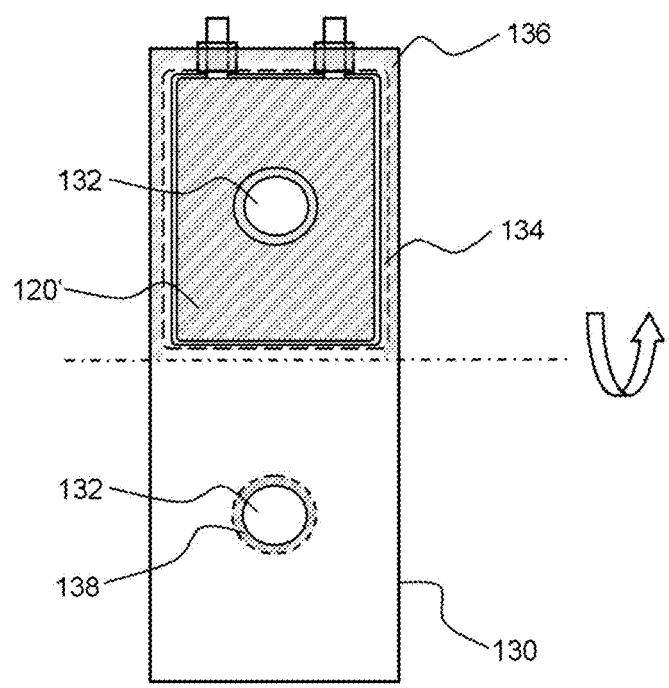

FIGS. 11 to 13 are typical views showing a process of manufacturing the battery cell of FIG. 1.

Referring to these drawings, a middle region of each electrode 122, such as a cathode or a anode, is punched to form a circular through hole 124 and then the electrodes 122 are stacked in a state in which separators 126 are respectively disposed between the electrodes 122 to manufacture an electrode assembly 120. Subsequently, a circular through hole 124' having a smaller area than the through hole formed at each electrode 122 is formed through each separator 126 in order to secure portions of the separators to seal the through holes 124.

The electrode assembly is formed in the shape of a rectangle when viewed from above in a direction in which the electrodes are stacked and the center of each through hole 124' is aligned with the planar center of an electrode assembly 120' in the direction in which the electrodes 122 are stacked. However, the structure of the electrode assembly is not limited to the structure shown in the drawing. For example, the center of each through hole may be located with respect to the planar center of the electrode assembly in the direction in which the electrodes are stacked within an error range equivalent to 30% the length of one side of the electrode assembly.

In addition, a battery case is manufactured to have a structure in which the battery case is provided with a middle opening communicating with the through hole of the electrode assembly as shown in FIGS. 2 to 4.

Referring to FIG. 13, a battery case 130 is a single member configured to have a structure in which an electrode assembly receiving unit 134 is formed at one side of the member and the other side of the member covers the electrode assembly receiving unit 134 in a state in which the member is folded. In addition, the battery case 130 is provided at one side and the other side thereof with middle openings 132 communicating with the through hole of the electrode assembly 120'.

After the electrode assembly 120' is mounted in the electrode assembly receiving unit 134 of the battery case 130 configured as described above, one side or the other side of the battery case 130 is folded and a thermally bonded outer circumferential sealing portion 136 of the battery case 130 is sealed by thermal bonding. In addition, a thermally bonded inner circumferential sealing portion 138 formed along the inside of the middle opening 132 of the battery case 130 is also sealed by thermal bonding. At this time, the separators located at the through hole of the electrode assembly 120' are thermally bonded together with the thermally bonded inner circumferential sealing portion 138 of the middle opening 132 such that the electrode assembly 120' is fixed at the middle opening 132. When external force is applied to the batter case 130, therefore, the electrode assembly 120' is prevented from being pushed in the batter case 130.

Figure 14:
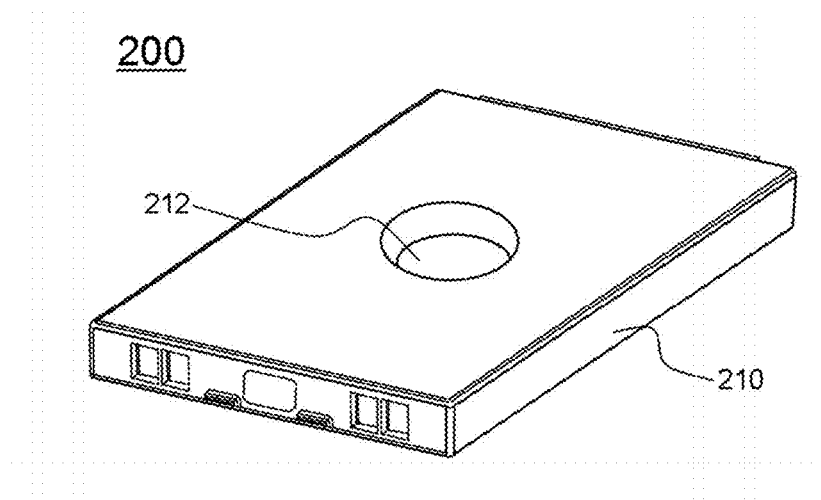
FIG. 14 is a typical view showing a battery pack having the battery cell of FIG. 1 mounted therein.

FIG. 14 is a typical view showing a battery pack having the battery cell of FIG. 1 mounted therein. Referring to FIG. 14, a pack case 210 of a battery pack 200 is provided with a through hole 121 communicating with the through hole of the electrode assembly of the battery cell and the middle opening of the battery case.

Meanwhile, when a plurality of battery packs 200, each of which has the through hole 121 formed therethrough, is stacked to constitute a battery module, it is possible to easily and simply fix the stacked structure of the battery packs 200 using a fixing member extending through the through holes 121 of the stacked battery packs 200.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention has an advantage in that electronic parts are mounted in a space in which the through holes and the opening communicate with each other.

In addition, the through hole and the opening can reduce the magnitude of external impact and, therefore, it is possible to minimize deformation of the battery cell due to external impact.

In addition, the damping member can reduce the magnitude of external impact and, therefore, it is possible to minimize deformation of the battery cell due to external impact.

In addition, the separators can cover the edges of the anodes and the cathodes and, therefore, it is possible to prevent an internal short circuit of the battery cell due to external impact.

In addition, in the battery cell according to the present invention, it is possible to prevent the electrode assembly from being damaged in the battery case due to the thermally bonded sealing portion and the welded portion when external impact is applied to the battery cell.

In addition, in the battery cell according to the present invention, it is possible to prevent the electrode assembly from being damaged in the battery case due to the damping member or the opening support member when external impact is applied to the battery cell.

In addition, in the battery cell according to the present invention, the electrode tabs or electrode leads may be exposed in the through hole or the opening. In this case, a space necessary to form the electrode tabs or electrode leads is minimized, thereby achieving miniaturization and thinning of the battery cell.

The invention claimed is:

1. A battery cell comprising:
    an electrode assembly configured to have a structure comprising cathodes, anodes, and separators respectively disposed between the cathodes and the anodes, the electrode assembly being provided with a through hole in a direction in which the electrodes are stacked; and
    a battery case provided at each side thereof with an opening communicating with the through hole,
    wherein a welded portion or a thermally bonded sealing portion is formed along an inside of the opening.

2. The battery cell according to claim 1, wherein the electrode assembly is configured to have a wound type structure, a stacked type structure, or a stacked/folded type structure.

3. The battery cell according to claim 1, wherein the electrode assembly is formed in the shape of a circle, an oval, or a polygon when viewed from above in the direction in which the electrodes are stacked.

4. The battery cell according to claim 1, wherein a center of the through hole is aligned with a planar center of the electrode assembly when viewed from above in the direction in which the electrodes are stacked.

5. The battery cell according to claim 1, wherein a center of the through hole is not aligned with a planar center of the electrode assembly when viewed from above in the direction in which the electrodes are stacked.

6. The battery cell according to claim 1, wherein the battery case is a can-shaped battery case or a pouch-shaped battery case.

7. The battery cell according to claim 6, wherein the can-shaped battery case is formed of a metal material or a plastic material.

8. The battery cell according to claim 6, wherein the pouch-shaped battery case is formed of a laminate sheet comprising a resin layer and a metal layer.

9. The battery cell according to claim 1, wherein a cathode lead and an anode lead connected to the electrode assembly protrude inwardly of the opening of the battery case.

10. The battery cell according to claim 1, wherein a sealing tape is attached to the welded portion or the thermally bonded sealing portion such that the sealing tape wraps the welded portion or the thermally bonded sealing portion.

11. The battery cell according to claim 1, wherein a damping member is mounted to an inside of the through hole of the electrode assembly.

12. The battery cell according to claim 1, wherein an opening support member is mounted along an inside of the opening of the battery case.

13. The battery cell according to claim 1, wherein the electrode assembly is configured to have a structure in which the separators are longer than the cathodes and the anodes toward a center of the through hole and ends of the separators adjacent to the through hole are bent to cover edges of the cathodes or the anodes.

14. A battery pack comprising a battery cell according to claim 1 mounted in a pack case.

15. The battery pack according to claim 14, wherein the pack case is provided with a through hole communicating with a through hole of an electrode assembly of the battery cell and an opening of a battery case.

16. A device comprising a battery pack according to claim 15.

17. The device according to claim 16, wherein the device is selected from a group consisting of a laptop computer, a mobile phone, a portable display player (PDP), a portable multimedia player (PMP), an MP3 player, a digital still camera (DSC), a digital video recorder (DVR), a smart phone, a global positioning system (GPS), a camcorder, an electric vehicle, a hybrid electric vehicle, a plug-in hybrid electric vehicle, and a power storage device.

18. A device comprising a battery cell according to claim 1.

19. The device according to claim 18, wherein the device is selected from a group consisting of a laptop computer, a mobile phone, a portable display player (PDP), a portable multimedia player (PMP), an MP3 player, a digital still camera (DSC), a digital video recorder (DVR), a smart phone, a global positioning system (GPS), a camcorder, an electric vehicle, a hybrid electric vehicle, a plug-in hybrid electric vehicle, and a power storage device.

20. A battery cell comprising:
an electrode assembly configured to have a structure comprising cathodes, anodes, and separators respectively disposed between the cathodes and the anodes, the electrode assembly being provided with a through hole in a direction in which the electrodes are stacked; and
a battery case provided at each side thereof with an opening communicating with the through hole,
wherein a cathode lead and an anode lead connected to the electrode assembly protrude inwardly of the opening of the battery case.

21. A battery cell comprising:
an electrode assembly configured to have a structure comprising cathodes, anodes, and separators respectively disposed between the cathodes and the anodes, the electrode assembly being provided with a through hole in a direction in which the electrodes are stacked; and
a battery case provided at each side thereof with an opening communicating with the through hole,
wherein a damping member is mounted to an inside of the through hole of the electrode assembly.

22. A battery cell comprising:
an electrode assembly configured to have a structure comprising cathodes, anodes, and separators respectively disposed between the cathodes and the anodes, the electrode assembly being provided with a through hole in a direction in which the electrodes are stacked; and
a battery case provided at each side thereof with an opening communicating with the through hole,
wherein an opening support member is mounted along an inside of the opening of the battery case.

23. A battery cell comprising:
an electrode assembly configured to have a structure comprising cathodes, anodes, and separators respectively disposed between the cathodes and the anodes, the electrode assembly being provided with a through hole in a direction in which the electrodes are stacked; and
a battery case provided at each side thereof with an opening communicating with the through hole,
wherein the electrode assembly is configured to have a structure in which the separators are longer than the cathodes and the anodes toward a center of the through hole and ends of the separators adjacent to the through hole are bent to cover edges of the cathodes or the anodes.

* * * * *